United States Patent [19]

Hesch et al.

[11] Patent Number: 5,407,309
[45] Date of Patent: Apr. 18, 1995

[54] ALL PURPOSE RAILWAY SPINE CAR

[75] Inventors: Harold E. Hesch, St. John, Ind.; Albert A. Beers, Duncanville, Tex.

[73] Assignee: Trinity Industries, Inc., Dallas, Tex.

[21] Appl. No.: 49,551

[22] Filed: Apr. 19, 1993

Related U.S. Application Data

[63] Continuation-in-part of Ser. No. 749,686, Aug. 26, 1991, Pat. No. 5,246,321.

[51] Int. Cl.6 .......................... B61D 45/00; B60P 7/13
[52] U.S. Cl. ........................................ 410/56; 410/54; 105/416; 105/355; 105/404
[58] Field of Search .................... 410/54, 56, 58–64, 410/71–73, 83; 105/416, 419, 355, 404

[56] References Cited

U.S. PATENT DOCUMENTS

| | | | |
|---|---|---|---|
| 2,079,552 | 5/1937 | Fenstermacher et al. | 105/414 |
| 2,103,751 | 12/1937 | Kellett | 105/366 |
| 3,085,518 | 4/1963 | Szczepanik et al. | 105/366 |
| 3,161,151 | 12/1964 | Johhansson | 105/368 |
| 3,207,086 | 9/1965 | M-Larssen et al. | 105/368 |
| 3,370,550 | 2/1968 | Gutridge et al. | 105/368 |
| 3,507,226 | 4/1970 | Nadherny | 105/366 |
| 3,577,933 | 5/1971 | Ferris et al. | 105/366 |
| 3,586,286 | 6/1971 | Pratt | 248/361 |
| 3,618,999 | 11/1971 | Hlinsky et al. | 296/35 |
| 3,659,724 | 5/1972 | Miller et al. | 213/8 |
| 4,339,996 | 7/1982 | Brodeur et al. | 105/3 |
| 4,547,107 | 10/1985 | Krause | 410/58 |
| 4,636,119 | 1/1987 | Terlecky | 410/54 |
| 4,686,907 | 8/1987 | Woollam et al. | 105/4.1 |
| 4,750,431 | 6/1988 | Yates et al. | 105/4.1 |
| 4,825,778 | 5/1989 | Riley | 105/393 |
| 4,826,371 | 5/1989 | Brown | 410/54 |
| 4,854,791 | 8/1989 | Brown | 410/54 |
| 4,864,938 | 9/1989 | Hesch et al. | 105/4.1 |
| 4,917,019 | 4/1990 | Hesch et al. | 105/4.1 |
| 5,052,868 | 10/1991 | Hesch et al. | 410/54 |
| 5,090,331 | 2/1992 | Hesch et al. | 105/3 |
| 5,161,469 | 11/1992 | Hesch | 105/404 |
| 5,246,321 | 9/1993 | Hesch | 410/58 |

Primary Examiner—Michael S. Huppert
Assistant Examiner—Stephen Gordon
Attorney, Agent, or Firm—Baker & Botts

[57] ABSTRACT

An improved articulated railway spine car unit for carrying highway truck trailers and/or containers has a center sill which extends substantially the entire length of the car unit. The center sill has end portions with upper surfaces depressed with respect to the upper surface of a longitudinally extended center portion. A retractable fifth wheel or trailer hitch is located on the upper surface of at least one end portion of the center sill. The upper surface of the trailer hitch, when retracted onto the center sill, is at substantially the same level as the center portion of the center sill. The raised center sill center portion both provides backup support for the floors of containers carried on the car unit, and also increases the center sill's structural rigidity and resistance to bending deflection. Stowable container locks extending through trailer wheel decks on the car unit are provided with pivotable covers which cover the locks and associated wheel deck openings when the locks are stowed, and secure the locks in their upright position when a container is to be mounted thereon.

12 Claims, 3 Drawing Sheets

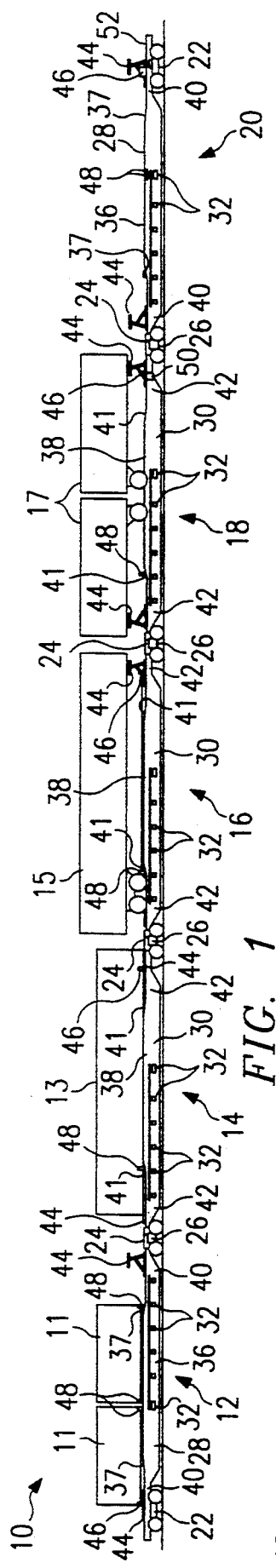

ALL PURPOSE RAILWAY SPINE CAR

RELATED APPLICATION

This application is a Continuation-In-Part Application based on patent application U.S.S.N. 07/749,686 filed, Aug. 26, 1991, now U.S. Pat. No. 5,246,321.

TECHNICAL FIELD OF THE INVENTION

The present invention generally relates to railway cars, and more particularly, is concerned with an improved articulated railway spine car for carrying highway truck trailers, containers and/or other types of cargo including apparatus for securing containers, trailers and/or other types of cargo thereon.

BACKGROUND OF THE INVENTION

Articulated railway cars designed for carrying highway truck trailers and/or containers are well known. In the usual arrangement, an articulated car consists of preferably five interconnected car units in which the remote ends of the end units have standard trucks and have standard couplers for coupling with couplers of other cars in a train makeup. The interior ends of the end car units and the other three car units have articulated connections for close coupling to accommodate one truck which spans and supports the ends of two adjacent car units.

Fuel conservation and environmental concerns require that these railway cars be designed with minimum weight but without sacrificing structural strength and stability for carrying fully loaded containers and/or truck trailers. In order to reduce car weight, manufacturers of some cars have eliminated a support structure for preventing container lading from falling to the tracks in the event of a container floor failure. The lack of such support structure is highly undesirable.

Manufacturers have also reduced car weight by reducing the height, depth and web and flange thicknesses of structural members such as the center sill and crossbearers. This size downgrading of structural members has the adverse effect, however, of increasing axial and bending stresses in, and deflection of, load bearing structural members, particularly when a car unit is loaded with two containers or trailers end-to-end. This type of loading subjects the center sill member to a very high bending moment adjacent to its midpoint. Therefore, the center sill member must be increased in size or carefully designed and constructed to avoid undue deflection of the center sill.

Dual purpose cars designed for carrying both containers and highway truck trailers typically have wheel pans or decks for supporting the wheels of a trailer, and container brackets, mounts or locks for securing the lower edges of containers. At least two of the container locks are typically located on or adjacent to the wheel pans of the car. In order to prevent interference between the container locks and the wheels of a trailer, it is known in the prior art to use pivotable or stowable container locks on the wheel pans. When not in use, pivotally supported locks can be rotated to a stowed position below the wheel deck surface. For example, see the pivotally mounted container locks disclosed by Hesch, et al., in U.S. Pat. No. 5,052,868, issued Oct. 1, 1991, entitled "All Purpose Car."

Although useful in preventing interference with the wheels of a trailer on the wheel pans, pivotable container locks of the prior art suffer from an inherent disadvantage. These existing locks have the tendency, when erected for receiving a container, to inadvertently move into a horizontal or stowed position before a container can be installed on the lock. Once a container is installed on the lock, the container holds the lock in the upright position. However, prior to loading the container, the lock is not positively retained in its upright position and can be inadvertently moved to the stowed position when engaged in the wrong direction, such as by the container.

Prior dual purpose articulated cars also have limited capacity for carrying the longer highway truck trailers that are increasingly being used by transporters. Trailers and containers longer than 48 feet cannot be carried on existing car units without sacrificing carrying space on an adjacent car unit.

Consequently, a need exists for a lightweight railway car for transporting containers, highway truck trailers and similar types of cargo with improved structural resistance to deflection when carrying fully loaded and also providing back-up support for container floors which occasionally rupture from the weight of the container lading. A need also exists for an articulated railway car with car units that can each accommodate both containers and highway truck trailers up to 53 feet in length without loss of carrying capacity on adjacent car units. A further need exists for a means for securing stowable container locks in their upright position prior to and during the loading of a container thereon.

SUMMARY OF THE INVENTION

In accordance with the present invention, disadvantages and problems associated with previous spine cars and locking mechanisms for securing highway truck trailers, containers and other types of cargo on the spine car have been substantially reduced or eliminated by using the present invention.

In an articulated railway spine car unit for transporting highway truck trailers and containers and having at least one retractable trailer hitch, an improved center sill extending substantially the entire length of the car unit, and having end portions with upper surfaces depressed with respect to the upper surface of a longitudinally extended center portion, the end portions of the center sill being depressed for receiving the trailer hitch when attached thereto and folded beneath a container mounted on the car unit. A longitudinally extended center portion of the center sill has an upper surface raised with respect to the upper surfaces of its end portions for providing back-up support for the floors of containers when transported thereon, and for providing increased strength and resistance to deflection of the center sill when multiple containers are transported thereon.

In an articulated railway spine car unit for transporting highway truck trailers and containers, an improved pivotable container lock for securing containers thereon, said lock being pivotal between an upstanding position for mounting a container thereon, and a horizontal position for stowing said lock when no container is mounted thereon. A cover is located adjacent to the lock and pivotally attached to the car unit at one side. The cover, in one position covers the stowed container lock, and in another position engages the erected container lock to prevent movement of the lock to the stowed position.

A significant technical advantage of the present invention includes providing a railway spine car with lateral cross-bearing members at one end of the spine car spaced longitudinally from each other and having longitudinal beams extending between the lateral cross-bearing members. Container locks may be secured intermediate the ends of the respective longitudinal beams to accommodate containers and other types of cargo having varying lengths. Thus, the present invention allows adjusting the location of container locks on existing railway spine car to accommodate containers and similar types of cargo having variations in length without requiring changes to the overall length and design of the railway car.

A further technical advantage of the present invention includes providing a railway car unit which can accommodate containers having 53-foot lengths.

Another technical advantage of the present invention includes providing a railway car unit which can accommodate containers and highway truck trailers of increased length while limiting any increase in the empty car weight of the railway car unit.

BRIEF DESCRIPTION OF THE DRAWINGS

For a more complete understanding of the present invention, and the advantages thereof, reference is now made to the following description taken in conjunction with the accompanying drawings, in which:

FIG. 1 is a side elevational view of an articulated railway spine car of the present invention having five car units, showing how an assortment of different length trailers and containers might be transported thereon;

FIG. 2 is a plan view of the railway spine car of FIG. 1;

FIG. 5 is an enlarged front elevational view of a rotatable container lock and lock cover on a car unit, taken along line 5—5 of FIG. 4, with the rotatable container lock in its horizontal, stowed position;

FIG. 6 is a front elevational view of the container lock and lock cover of FIG. 5 with the lock secured in its upright, erect position;

FIG. 7 is a front elevational view of the container lock cover in the raised, upright position, showing the attachment of the hinge pin to the trailer wheel pan and the rotatable lock in its upright position.

DETAILED DESCRIPTION OF THE INVENTION

Figure 3:
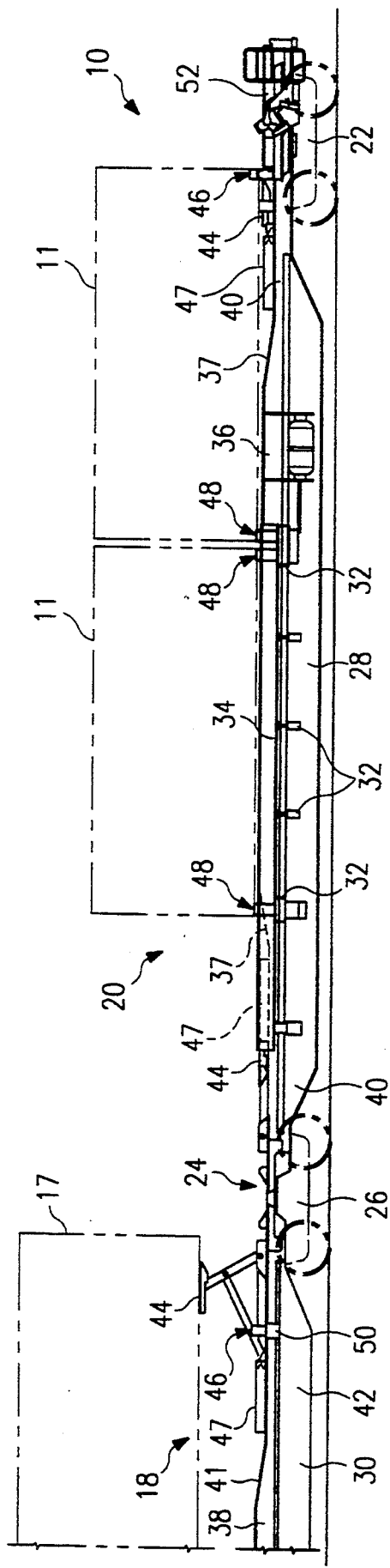
FIG. 3 is an enlarged side elevational view of an end car unit and a fragmentary elevational view of an adjacent intermediate car unit of the railway spine car of FIG. 1.

The preferred embodiments of the present invention and its advantages are best understood by referring to the following written description and the drawings, like numerals being used for like and corresponding parts of the various drawings.

In FIGS. 1 and 2 there is shown an articulated railway spine car 10 made up of five car units which embodies the present invention. Also shown in FIG. 1 are an assortment of various length containers 11 and 13 and trailers 15 and 17 which might be carried on the car.

The present invention is particularly useful in transporting intermodal containers designed for movement by ships, highway trucks and railway cars. As a result of the present invention, railway spine car 10 can accommodate highway truck trailers varying in length from 28 feet to 53 feet, and/or containers varying in length from 20 feet to 53 feet. As will be explained later in more detail, the present invention allows modifying the location of container locks carried by railway spine car 10 to accommodate containers having a length greater than 53 feet without requiring substantial modification to the other components of railway spine car 10.

Railway spine car 10 is made up of end car units 12 and 20 and intermediate car units 14, 16 and 18. The end units 12 and 20 are functionally and structurally identical, and the intermediate units 14, 16, and 18 are functionally and structurally identical. The remote ends of the end car units 12 and 20 have standard trucks 22 and standard couplers (not shown) for coupling with couplers of other cars in a typical train makeup. The interior ends of the end car units 12 and 20 and each end of the intermediate car units 14, 16, 18 have articulated connections 24 for close coupling to one another and to accommodate a truck 26 which spans and supports the ends of the two adjacent car units.

Figure 4:
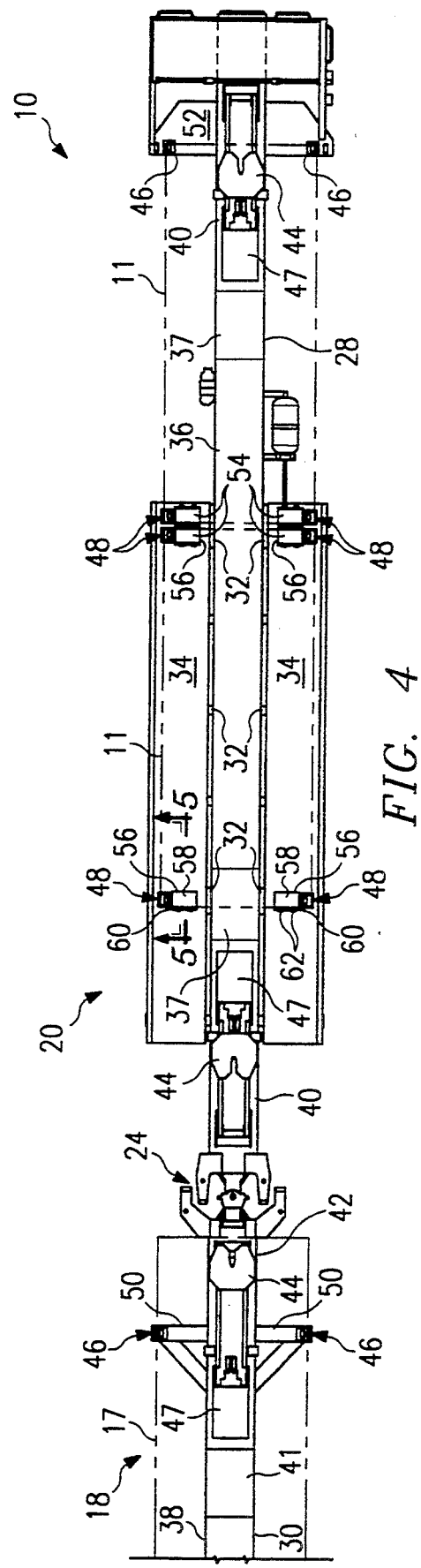
FIG. 4 is a plan view of the car units of FIG. 3.

The primary load-bearing member of each car unit is a center sill 28 (end car units 12 and 20) or 30 (intermediate car units 14, 16, 18) which extends the full length of the car unit, and supports cross braces 32, which in turn support trailer wheel pans or decks 34. The center sill 28 or 30 also supports near one of its ends a container cross-bearing member, which in the case of an intermediate car unit 14, 16, or 18, is a cross bearer or bolster 50, and in the case of an end car unit 12 or 20 is a body bolster 52. FIGS. 3 and 4 illustrate end car unit 20 and a portion of adjoining intermediate car unit 18 in greater detail.

As shown in FIGS. 3 and 4, each center sill 28 or 30 has a longitudinally extended center portion 36 or 38, respectively, with an upper surface raised or elevated with respect to the upper surfaces of its end portions 40 or 42, respectively. Center sill center portions 36 or 38 are connected to end portion 40 or 42, respectively, by transition portions 37 or 41, respectively. The transition portions 37 and 41 are preferably sloping, as shown, from the top surfaces of the center portions 36 and 38 to the top surfaces of the end portions 40 and 42, respectively.

Installed on the end portions 40 and 42 of the car units is a retractable or collapsible fifth wheel or trailer hitch 44. The hitches 44 can be erected, as illustrated on car units 16 and 18, for receiving a king pin (not shown) on the front end of a highway truck trailer. The hitches are retractable to a flat, collapsed position, as illustrated on car units 12 and 14 in FIG. 1, and on car unit 20 in FIG. 3, for providing the needed clearance for mounting a container on the container locks 46 or 48. The retractable trailer hitches 44 are well known in the railway car art, as disclosed by Hesch, et al. in U.S. Pat. No. 5,052,868.

As discussed above, the upper surfaces of end portions 40 and 42 of center sills 28 and 30, respectively, are depressed with respect to the upper surfaces of their center portions 36 and 38, respectively. The amount of this depression is such that, when trailer hitch 44 is retracted to its collapsed position on the center sill end portion 40 or 42, the upper surfaces of hitch 44 and its supporting members do not extend above the upper surface of the center sill center portion 36 or 38. Thus, when the trailer hitches 44 on a car unit are retracted, the hitch 44 together with the center sill center portions 36 or 38 present an extended, substantially flat, rigid supporting surface in a generally uniform plane providing back-up support for the floors of containers 11 or 13 mounted on the car unit, as illustrated on car units 12 and 14 of FIG. 1, and in more detail on car unit 20 in FIG. 3. The raised center sill center portion 36 or 38 also increases the structural rigidity and resistance to bending deflection of the center sill 28 or 30 when the car unit is transporting end-to-end truck trailers 17 or containers 11.

Referring again to FIG. 4, cover plates 47 overlie a portion of collapsed hitches 44, further increasing the support for the container bottoms. The tops of the plates 47 are also located no higher than the top surfaces of the center sills 36 and 38.

As seen in FIGS. 1 and 2, and more clearly in FIGS. 3 and 4, fixed container securing means or locks 46 are installed on cross bearers 50 on intermediate car units 14, 16, and 18, and on body bolsters 52 on end car units 12 and 20. Pivotable, stowable container securing means or locks 48 are installed on at least one of the cross braces 32, and extend through wheel pans or decks 34 of each car unit. It will be noted that end car units 12 and 20, unlike intermediate car units 14, 16, and 18, have two closely spaced pairs of pivotable container locks 48 extending through the wheel decks 34 near the center of the car units. The additional container locks 48 are located on the end car units 12 and 20 to enable these end car units to carry two containers 11 end-to-end. Only the end car units 12 and 20, which are supported at one end by a standard truck 22, are designed to carry the additional weight loading imposed by two end-to-end containers 11.

As best illustrated in FIGS. 5 and 6, pivotable container locks 48 pivot between an upstanding position extending above wheel deck 34 for mounting a container 11 or 13 thereon, and a horizontal position recessed below wheel deck 34 for stowing the locks when not in use. The container locks 48 are stowed below the surface of wheel deck 34 to permit clearance for the wheels of a trailer 15 or 17 on deck 34.

Also shown in FIGS. 5, 6 and 7 is a container lock cover 54 (typical for pivotable container locks) which serves two purposes. Referring to FIG. 5, when a container lock 48 is pivoted into its horizontal, stowed position, cover 54 substantially covers the opening 56 in wheel deck 34 which receives the stowed container lock 48. When thus used, cover 54 provides a substantially continuous surface for the deck 34 and prevents a trailer wheel from becoming lodged in opening 56 through which the lock 48 extends when erected. As shown in FIGS. 5 and 7, support bar 202 may be provided with each pivotable container lock 48 to provide additional support for cover 54 when lock 48 is in its horizontal position.

Referring to FIGS. 6 and 7, when the container lock 48 is rotated into its upright position for receiving a container, cover 54 secures lock 48 in the upright position, and prevents lock 48 from inadvertently being moved into the stowed position prior to or during the loading of a container thereon. When thus used, an end 58 of cover 54 abuts the side of the lock 48 and thus prevents lock 48 from rotating to the horizontal position.

As best seen in FIG. 7, the pivoted side of the cover 54 has tubular portions 62 for receiving a hinge pin 60 which is attached to wheel deck 34, preferably by welding. The cover 54 thus pivots about hinge pin 60, and is rotated to an inclined or vertical position, as indicated in FIG. 6, when container lock 48 is to be either stowed or erected. Cover 54 also has near its free edge a hole 64 sized to facilitate lifting cover 54 from its horizontal position.

Figure 8:
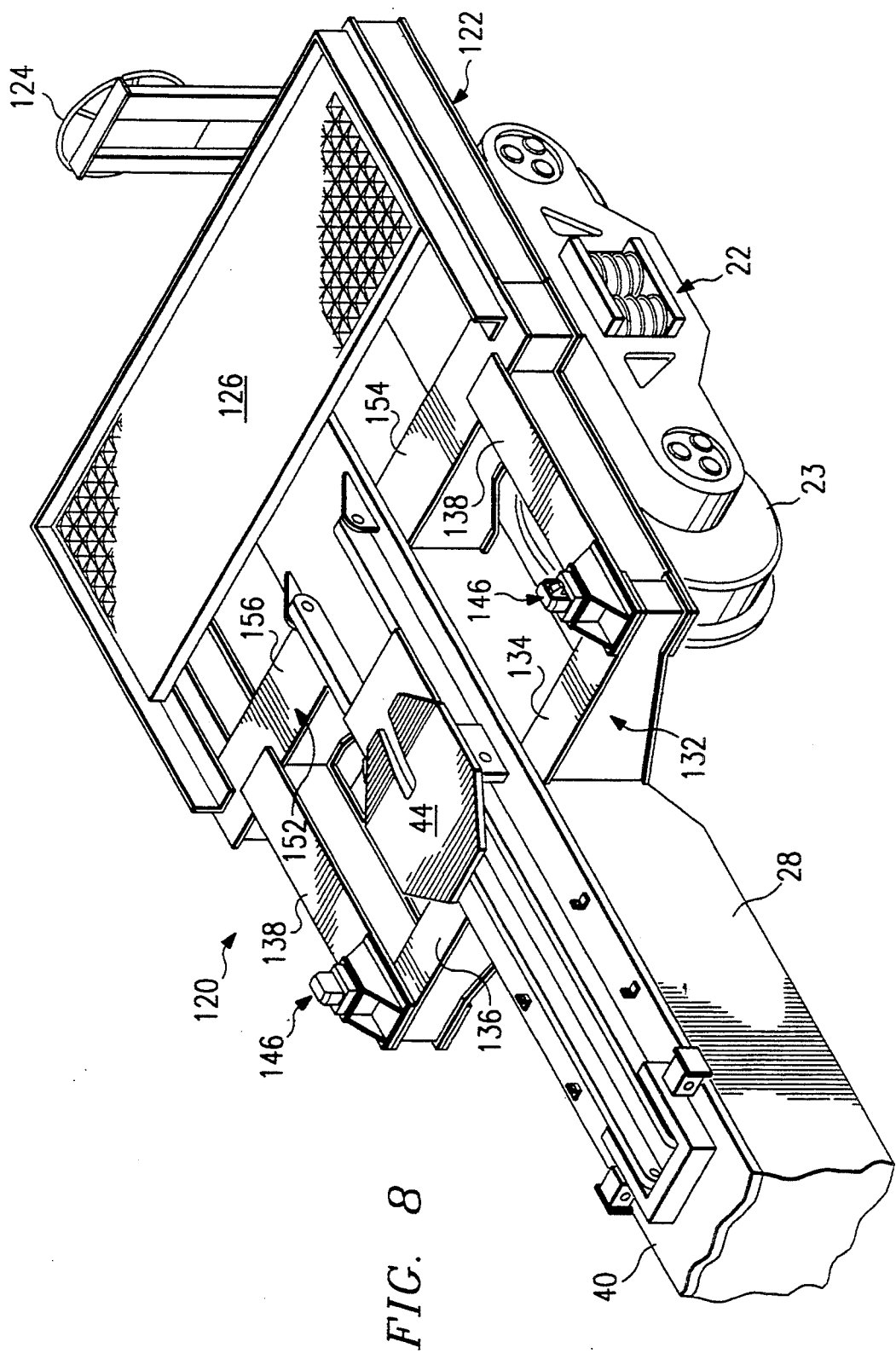
FIG. 8 is an enlarged isometric drawing with portions broken away of the center sill and cross-bearing members associated with an alternative embodiment of the end car unit of FIG. 3.

An alternative embodiment of the present invention as shown in FIG. 8 results in modification to the remote end of end car units 12 and/or 20. For purposes of explanation end car unit 120 is shown with modified remote end 122. The other portions of end car unit 120 may be the same as previously described for end car units 12 and 20. Alternatively, remote end 122 could be a portion of a single railway spine car with similarly designed remote ends 122.

Railway car unit 120 includes center sill 28, end portion 40, and retractable trailer hitch 44 as previously described for railway car unit 20. Cover 47 is not shown in FIG. 8. Remote end 122 of railway car unit 120 is attached to and supported by standard railway truck 22.

Two lateral cross-bearing members 132 and 152 are securely attached to center sill 28 adjacent to end portion 40. First cross-bearing member or body bolster 152 is preferably secured to center sill 28 intermediate the ends of railway truck 22. Second cross-bearing member or bolster 132 is preferably secured to center sill 28 spaced longitudinally from body bolster 152 and railway truck 22. A pair of longitudinal members or container lock support beams 138 extend longitudinally between first cross-bearing member (body bolster) 152 and second cross-bearing member (bolster) 132. Fixed container locks 146 are disposed on each container lock support beam 138 intermediate the ends thereof.

For end car unit 20, fixed container locks 46 are shown disposed on body bolster 52 as shown in FIGS. 1, 2, 3 and 4. By combining a second cross-bearing member or bolster 132 with first cross-bearing member of body bolster 152, and a pair of longitudinal members 138, fixed container locks 146 may be disposed on container lock support beams or longitudinal members 138 as required to accommodate containers having various lengths. As shown in FIG. 8, fixed container locks 146 are positioned adjacent to the connection between bolster 132 and the respective container lock support beams 138. However, fixed container locks 146 may be disposed at any position desired along the length of container lock support beams 138 as required to accommodate the containers which will be carried by end car 120. The specific location for fixed container locks 146 can be adjusted depending upon the location of rotatable retainer locks 48 which are carried by the other portions of end car unit 120 and the length of the container which will be secured to end car unit 120 and any other cargo such as highway truck trailers which will be carried on end car unit 120.

As shown in FIG. 8, first body bolster 152 has two extensions 154 and 156 which extend laterally from center sill 28. Second cross-bearing member or bolster 132 also has extensions 134 and 136 extending laterally from center sill 28. The length of extensions 154 and 156 is preferably longer than the length of extensions 134 and 136. This difference in lateral distance from center sill 128 allows container lock support beams 138 to be attached at the end of the respective extensions 134 and 136, and intermediate the ends of extensions 154 and 156 of body bolster 152. This configuration results in container lock support beams 138 being spaced inwardly from the outer edge of end car unit 120 as defined by the length of body bolster 152.

Second cross-bearing member 132 is preferably spaced longitudinally from body bolster 154 with railway truck wheel 23 disposed therebetween. Fixed locks 146 may then be positioned on container lock support beams 138 as desired without interfering with wheels 23 and/or other portions of standard railway truck 22. The position of fixed container locks 146 is also adjusted on container lock support beams 138 to minimize any interference between a container secured to end car unit 120 walkway 126 or the operation of hand brake 124. As a result of the present invention, the position of container locks 146 may be adjusted to accommodate different sizes of containers without requiring significant redesign or modification of center sill 28 and other components associated with end car unit 120, while at the same time, allowing access to walk way 126 and hand brake 124. If desired, rotatable container locks 48 could be secured to container lock support beams 138 rather than fixed container locks 146.

The railway car of the present invention, and many of its intended advantages, will be understood from the foregoing description. It will be apparent that, although the invention and its advantages have been described in detail, various changes, substitutions, and alterations may be made in the manner, procedure, and details thereof without departing from the spirit and scope of the invention, as defined by the appended claims, or sacrificing all of its material advantages, the forms hereinbefore described being merely preferred or exemplary embodiments thereof.

What is claimed is:

1. A railway car unit for transporting highway truck trailers, containers and other cargo, the railway car unit having a center sill extending substantially the length of the railway car unit and having a remote end anal an interior end, the railway car unit comprising:
    a body bolster adjacent to the remote end of the railway car unit and extending transversely with respect to the center sill and having a first end and a second end;
    a cross-bearing member extending transversely from the center sill and spaced longitudinally from the body bolster and having a first end and a second end;
    a pair of container lock support beams extending longitudinally between the body bolster and the cross-bearing member on opposite sides of the center sill; and
    a fixed container lock disposed on each support beam intermediate the ends thereof;
    a standard railway truck provided at the remote end of the railway car unit;
    the body bolster secured to the center. Sill at the remote end of the railway car unit above the standard railway truck; and
    the cross-bearing member disposed on the center sill spaced longitudinally from the body bolster with at least a portion of the standard railway truck disposed between the body bolster and the cross-bearing member.

2. The railway car unit as defined in claim 1 further comprising a retractable trailer hitch located adjacent the remote end of the railway car unit on an upper surface of the center sill.

3. The railway car unit as defined in claim 1 further comprising:
    the first end and the second end of the body bolster extending a first distance laterally from the center sill;
    the first end and the second end of the cross-bearing member extending a second distance laterally from the center sill;
    the second lateral distance for the ends of the cross-bearing member being less than the first lateral distance for the ends of the body bolster; and
    the container lock support beams extending respectively from the ends of the cross-bearing member to a location intermediate the ends of the body bolster.

4. The railway car unit as defined in claim 1 further comprising the interior end of the railway car unit having an articulated connection for close coupling to another railway car unit.

5. A railway car unit for transporting containers and other cargo, the railway car unit having a center sill extending substantially the length of the railway car unit, the railway car unit comprising:
    a first cross-bearing member adjacent to one end of the railway car unit and extending transversely with respect to the center sill, the first cross-bearing member having a first exterior end and a second exterior end;
    a railway truck adjacent to and connected with the one end of the railway car unit, the railway truck having a first set and a second set of wheels with the first set of wheels spaced longitudinally from the second set of wheels;
    a second cross-bearing member extending transversely from the center sill and spaced longitudinally from the first cross-bearing member, the second cross-bearing member having a first exterior end and a second exterior end;
    a pair of longitudinal members extending between the first and the second cross-bearing members on opposite sides of the center sill;
    a fixed container lock disposed on each longitudinal member intermediate the ends thereof; and
    the first cross-bearing member comprising a body bolster disposed immediately over the railway truck between the first set and the second set of wheels, at the one end of the railway car unit with one of the sets of the wheels disposed between the body bolster and the second cross-bearing member.

6. The railway car as defined in claim 5 further comprising a retractable trailer hitch located at the one end of the railway car unit on an upper surface of the center sill.

7. The railway car unit as defined in claim 5 further comprising:
    the first exterior end and second exterior end of the first cross-bearing member extending a first distance laterally from the center sill;
    the first and second exterior ends of the second cross-bearing member extending a second lateral distance with respect to the center sill;
    the second lateral distance for the ends of the second cross-bearing member being less than the lateral distance of extension for the ends of the first cross-bearing member;
    the longitudinal members extending from the respective exterior ends of the second cross-bearing member to a location intermediate the ends of the first cross-bearing member; and a railway truck wheel of the first set of wheels disposed between each longitudinal member and the center sill.

8. A railway car unit as defined in claim 5 further comprising a plurality of cross braces extending transversely from opposite sides of the center sill with rotatable container locking means supported by the cross braces.

9. The railway car unit as defined in claim 8 further comprising the fixed container locks spaced longitudinally from the rotatable container locking means to accommodate a 53-foot container.

10. A railway car unit having a first end and a second end with a center sill extending therebetween, the railway car unit comprising:

a first body bolster having a first end and a second end, the second end of the first body bolster attached to the center sill proximate the first end of the car unit;

a second body bolster having a first end and a second end, the second end of the second body bolster attached to the center sill proximate the first end of the railway car unit and longitudinally aligned with the first body bolster;

the first body bolster and the second body bolster disposed immediately over a standard railway truck located at the first end of the center sill;

a first cross-bearing member having a first end and a second end, the second end of the first cross-bearing member attached to the center sill at the first end of the railway car unit and longitudinally displaced from the first and second body bolsters in the direction of the second end of the railway car unit;

a second cross-bearing member having a first end and a second end, the second end of the second cross-bearing member attached to the center sill at the first end of the railway car unit and longitudinally displaced from the first and second body bolsters and longitudinally aligned with the first cross-bearing member;

the first cross-bearing member and the second cross-bearing member spaced longitudinally from the standard railway truck;

a first longitudinal member having a first end and a second end, the first end of the first longitudinal member attached to the first end of the first cross-bearing member, the second end of the first longitudinal member attached to the first body bolster between the first and second ends of the first body bolster;

a second longitudinal member having a first end and a second end, the first end of the second longitudinal member attached to the first end of the second cross-bearing member, the second end of the second longitudinal member attached to the second body bolster between the first and second ends of the second body bolster;

a lateral distance between the first end of the first body bolster and the first end of the second body bolster being greater than the lateral distance between the first end of the first cross-bearing member and the first end of the second cross-bearing member;

a first fixed container lock attached to the first longitudinal member for releasably holding a container thereon; and a second fixed container lock attached to the second longitudinal member for releasably holding a container thereon.

11. The railway car unit as defined in claim 10 further comprising a wheel of the standard railway truck disposed between each body bolster and its associated cross-bearing member.

12. The railway car unit as defined in claim 11 further comprising an articulated connection attached to the second end of the railway car unit.

* * * * *

UNITED STATES PATENT AND TRADEMARK OFFICE
CERTIFICATE OF CORRECTION

PATENT NO. : 5,407,309

DATED : Apr. 18, 1995

INVENTOR(S) : Hesch, et al.

It is certified that error appears in the above-identified patent and that said Letters Patent is hereby corrected as shown below:

Column 7, line 6, delete "154" and insert -- 152 --;

Column 7, line 39, after "remote end" delete "anal" and insert -- and --;

Column 7, line 57, after "center" delete ". Sill" and insert -- sill --.

Signed and Sealed this

Twenty-fourth Day of October, 1995

*Attest:*

BRUCE LEHMAN

*Attesting Officer*  *Commissioner of Patents and Trademarks*